United States Patent [19]

Sheldon

[11] Patent Number: 5,771,747
[45] Date of Patent: Jun. 30, 1998

[54] MACHINE HAVING AN ADJUSTABLE FRAMEWORK AND AN INTERNAL MULTI-AXIS MANIPULATOR

[75] Inventor: Paul C. Sheldon, Mequon, Wis.

[73] Assignee: Sheldon/Van Someren, Inc., Wauwatosa, Wis.

[21] Appl. No.: 706,828

[22] Filed: Sep. 3, 1996

[51] Int. Cl.⁶ .................................................. B25J 9/14
[52] U.S. Cl. ...................... 74/490.01; 248/654; 901/22
[58] Field of Search ................... 74/490.01, 490.03; 248/653, 654; 901/22, 23

[56] References Cited

U.S. PATENT DOCUMENTS

| | | | |
|---|---|---|---|
| 4,790,718 | 12/1988 | Vickers | 248/653 X |
| 5,259,710 | 11/1993 | Charles | 409/235 |
| 5,354,158 | 10/1994 | Sheldon et al. | 409/201 |
| 5,388,935 | 2/1995 | Sheldon | 409/235 X |
| 5,401,128 | 3/1995 | Lindem et al. | 409/132 |

FOREIGN PATENT DOCUMENTS 2083795  3/1982  United Kingdom ............ 901/23

*Primary Examiner*—Allan D. Herrmann
*Attorney, Agent, or Firm*—Robert A. Van Someren

[57] ABSTRACT

A multi-axis machine is disclosed. The machine includes an adjustable external framework having a pair of support structures connected by a plurality of servostruts. A multi-axis manipulator is attached to one support structure and may be designed to carry a tool. A workpiece may be attached to the other support structure for interaction with the tool as the tool is moved by the multi-axis manipulator. The controlled extension and retraction of both the framework struts and manipulator struts provide the multi-axis machine with increased versatility of operation.

19 Claims, 3 Drawing Sheets

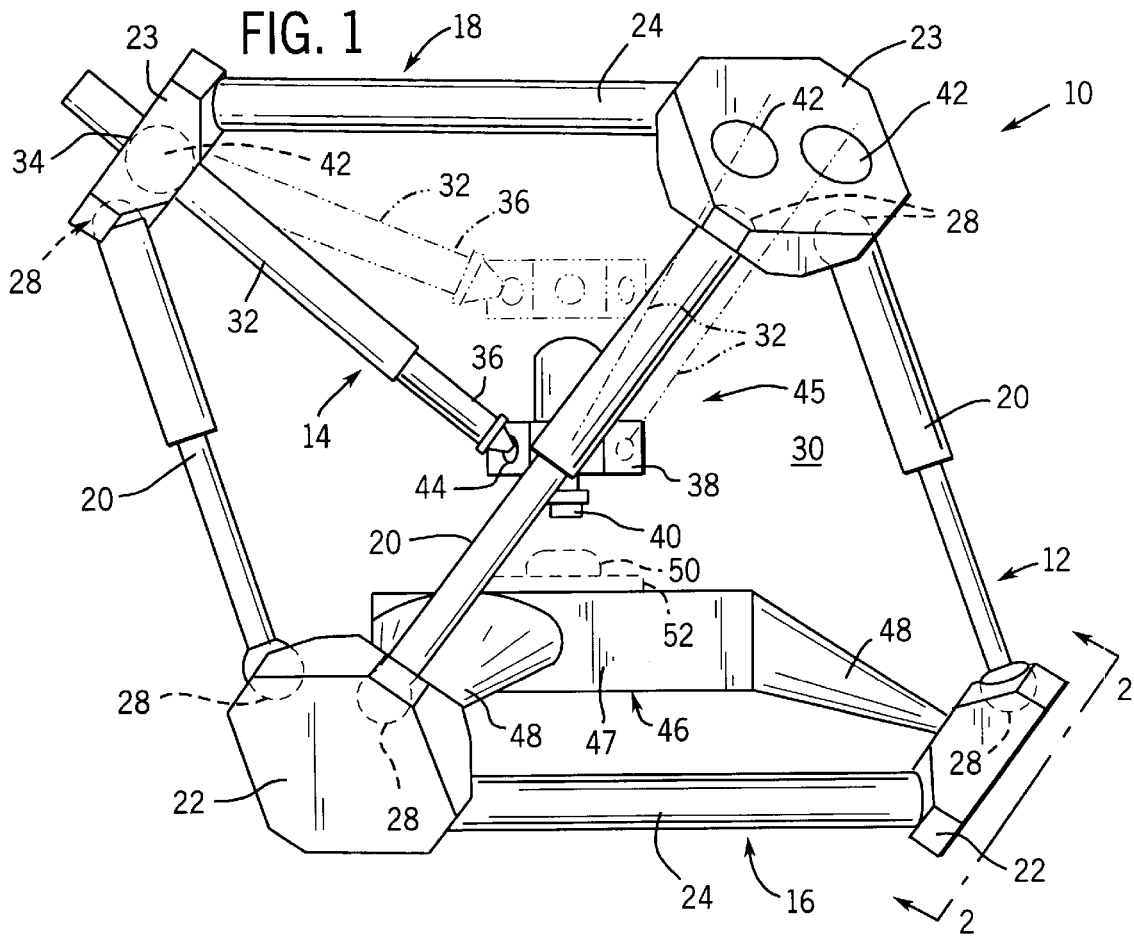
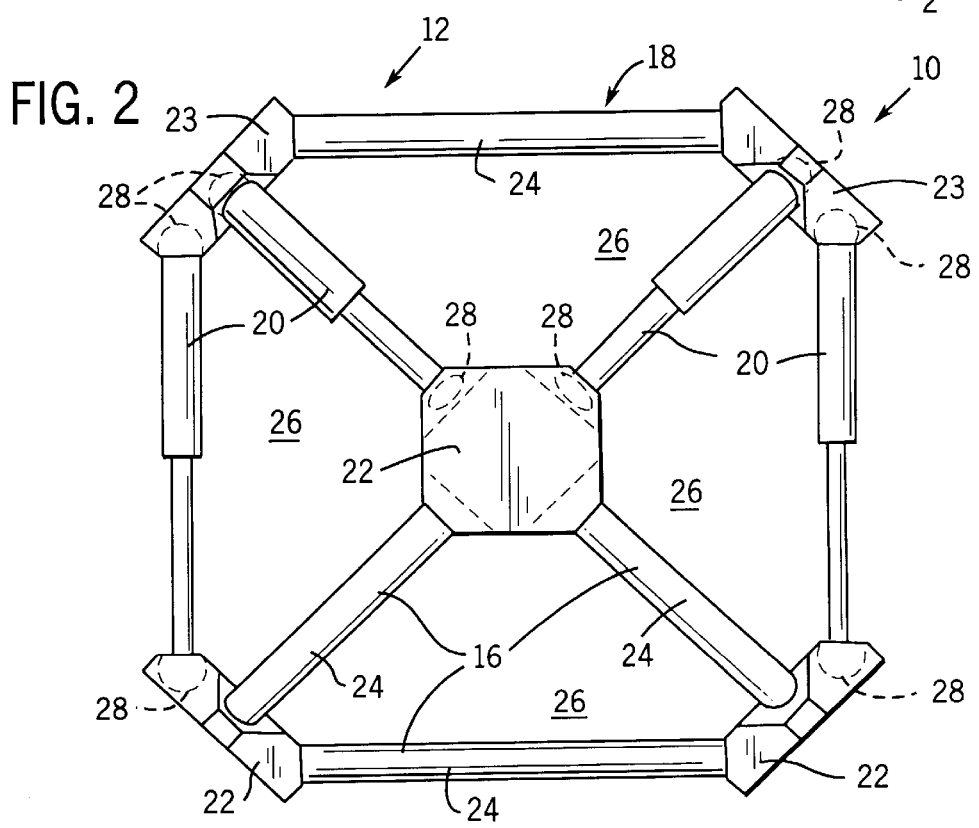

MACHINE HAVING AN ADJUSTABLE FRAMEWORK AND AN INTERNAL MULTI-AXIS MANIPULATOR

FIELD OF THE INVENTION

The present invention relates generally to machines, and particularly to machines having external frames with internal multi-axis manipulators.

BACKGROUND OF THE INVENTION

Machines are often required to move one object or component with respect to another. For example, tools, such as lasers, touch probes and cutters, used for cutting, drilling and milling are moved with respect to a workpiece as various operations are performed thereon. For certain applications, machines must be designed to move an operator such as tool along multiple axes to perform complex operations on a workpiece. Some of these machines are capable of manipulating a tool along six axes (the three linear axes and the three rotational axes) with respect to the workpiece. Typically, a manipulator mechanism designed to provide multiple degrees of freedom is attached to a framework. The manipulator either carries the tool and manipulates it about a workpiece affixed to the frame or carries the workpiece and manipulates it with respect to the tool.

Some machines require great accuracy and precision even under substantial load. For example, in the machine tool industry, it is necessary for the machine to cut materials, such a metal, precisely even when substantial forces are exerted between the tool and the workpiece. Thus, the overall machine, including its frame, must be sufficiently rigid to remain stable under those heavy loads, i.e., the components should not be susceptible to flexing, stretching or compressing when placed under load. It is difficult to maintain this rigidity along multiple axes as the tool is moved along complex cutting paths.

Ingersoll Milling Machine Company took a step toward solving these problems when it designed a machine having an octahedral framework with an internal hexapodal servostrut mechanism as described in U.S. Pat. No. 5,401,128. This machine takes advantage of the natural rigidity of an octahedral frame while providing the tool with six degrees of freedom via the internal hexapodal servostrut mechanism. Although this design is an important advancement with respect to obtaining greater rigidity and flexibility during machining, the framework design has certain inherent disadvantages.

The demand for a greater range of complex movement and possibly even greater complexity in movement of the tool with respect to the workpiece may push current manipulators to their limitations unless greater adaptability of the framework itself is provided. Thus, it would be advantageous to combine an adaptable framework with a multi-axis manipulator.

Furthermore, in existing designs, the multiple struts of the framework surround the hexapodal manipulator and the platform on which a workpiece is mounted. The multiple struts effectively limit access to the workpiece mounting platform when large or oddly shaped workpieces are machined. These large or oddly shaped parts must either be machined on a different type of machine or, at best, moved into place on the work platform along a complex path. The latter, of course, requires additional equipment to help load and unload the workpieces from the machine.

The various drawbacks of currently available machine designs are addressed by the present invention.

SUMMARY OF THE INVENTION

The present invention features a machine for manipulating one object or component with respect to another. The machine comprises a framework that includes a first support section and a second support section. The first and second support sections preferably are connected by at least six framework struts. The framework struts are extensible and pivotably connected to the first support section and the second support section at predetermined locations to provide the framework with a generally octahedral shape.

A manipulator is connected to the first support section. It includes at least six manipulator struts that are extensible and joined by a moveable component, such as a tool attachment bracket.

A mounting structure is connected to the second support section and is designed to hold a second component, such as a workpiece. Both the framework struts and the manipulator struts can be extended and retracted selectively to manipulate the moveable component with respect to the mounting structure.

According to another aspect of the invention, an external framework includes a pair of support structures. The support structures are connected by a plurality of framework struts with at least one of the framework struts being extensible and pivotably mounted to each support structure. An internal support structure includes a plurality of manipulator struts. Each manipulator strut includes a base end pivotably mounted to one of the support structures and an operator end pivotably mounted to a moveable component. Both the manipulator struts and the framework struts can be extended and retracted selectively to move the moveable component with respect to a mounting structure though the interior of the framework.

According to yet another aspect of the invention, a method is provided for moving an object with respect to another along a plurality of axes. The method includes the steps of providing a self contained framework having a first support structure and a second support structure. The support structures are connected by a plurality of extensible framework struts that permit the first support structure to be moved with respect to the other.

The method further includes the step of attaching a manipulator, having a plurality of extensible manipulator struts, to the first support structure. The method also includes the step of pivotably connecting the plurality of extensible support struts to a moveable component. The moveable component is manipulated by the plurality of extensible manipulator struts with respect to the second support structure.

BRIEF DESCRIPTION OF THE DRAWINGS

The invention will hereafter be described with reference to the accompanying drawings, wherein like reference numerals denote like elements, and:

FIG. 1 is a perspective view of a machine according to a preferred embodiment of the invention, including an octahedral frame and a manipulator attached thereto;

FIG. 2 is an end view of FIG. 1 taken generally along line 2—2;

DETAILED DESCRIPTION OF THE PREFERRED EMBODIMENTS

Figure 3:
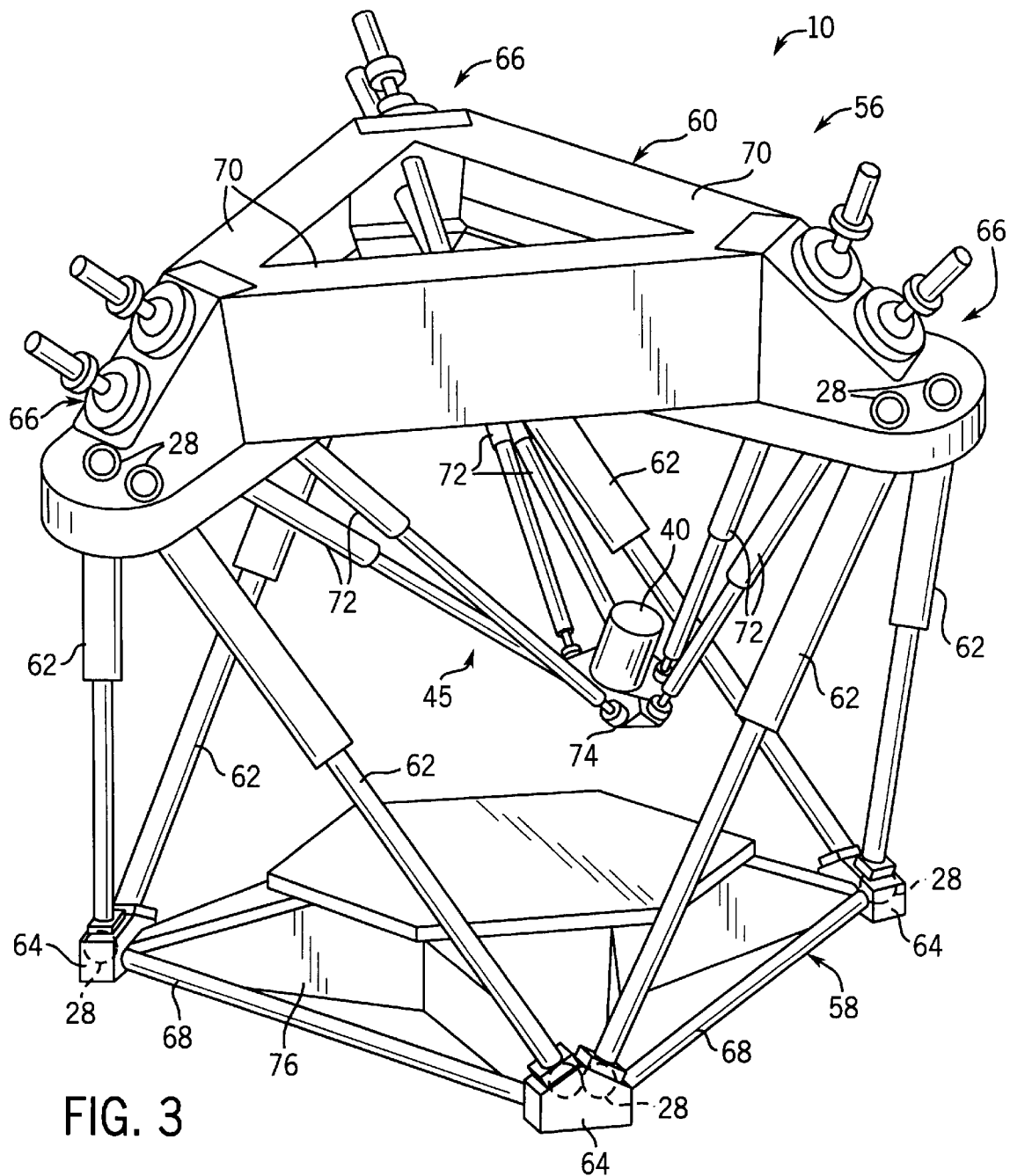
FIG. 3 is a perspective view of an alternate embodiment of the machine illustrated in FIG. 1.

Referring generally to FIGS. 1 and 2, a machine 10 according to a preferred embodiment of the invention is illustrated. Machine 10 includes a framework 12 and a manipulator mechanism 14.

Framework 12 includes a first support structure 16 and a second support structure 18. Support structures 16 and 18 are connected by a plurality of framework struts 20. Framework struts 20 are selectively extendible and retractable to permit adjustment to the shape or size of framework 12. Depending on the particular application, framework struts 20 can include a variety of actuators, but are preferably servostruts, such as hydraulically powered telescoping legs, legs employing a lead screw and rotating nut, ball screw driven powered legs or linear motor actuators. Thus, second support structure 18 can be moved with respect to the first support structure 16 by the extension or retraction of framework struts 20.

First and second support structures 16, 18 include a plurality of nodal structures 22, 23, respectively, to which framework struts 20 are connected as illustrated in FIGS. 1 and 2. The number of nodal structures 22, 23 and framework struts 20 will depend on the desired configuration of framework 12. An exemplary framework configuration is the octahedral framework illustrated in FIGS. 1 and 2. The octahedral design provides great rigidity. In the illustrated design, there are six framework struts 20 and six nodal structures 22, 23. Additionally, first support structure 16 and second support structure 18 preferably each have three support struts 24 arranged in a triangular pattern. In fact, the framework struts 20, nodal structures 22, 23 and support struts 24 are combined to form a plurality of triangular regions 26, as best illustrated in FIG. 2. The shape of framework 12 can, of course, be changed by adjusting framework struts 20.

To permit manipulation of framework 12, framework struts 20 are mounted to nodal structures 22, 23 by a plurality of pivot mounts 28. Each framework strut 20 is pivotably mounted at one end to a node 22 of first support structure 16 and at its other end to a nodal structure 23 of second support structure 18. Pivot mounts 28 can be designed in several different ways, but each pivot mount should provide its corresponding framework strut 20 with at least two degrees of freedom of motion. Exemplary embodiments of pivot mounts 28 include universal joints and the illustrated ball and socket joint.

Manipulator mechanism 14 is connected to at least one of the support structures 16 and 18. In the illustrated embodiment, manipulator mechanism 14 is connected to nodal structures 23 of second support structure 18 and generally extends into an interior region 30 of framework 12.

Manipulator mechanism 14 includes a plurality of manipulator struts 32 that each have a base end 34 and an operator end 36. Base ends 34 are pivotably mounted to nodal structures 23 of second support structure 18, and each operator end is connected to a moveable component 38, such as a mounting bracket or a tool 40. Typically, two base ends 34 are pivotably mounted to a corresponding nodal structure 23 by pivots, such as ball and socket pivots 42. Similarly, each operator end 36 is pivotably mounted to moveable component 38 by, for instance, a ball and socket pivot 44.

Manipulator struts 32 are extended or retracted selectively to manipulate moveable component 38 with respect to first support structure 16. Manipulator struts 32 have a variety of forms, including conventional ball and screw style struts or linear motor struts. Additionally, different numbers and arrangements of manipulator struts can be used depending on the application of machine 10. Typically, however, six individually extensible manipulator struts are mounted to framework 12 to provide up to six degrees of freedom of movement. A hexapodal manipulator 45, such as that illustrated best in FIGS. 1 and 3–4, potentially provides six-axis movement of tool 40. It also should be noted that the position of each actuator leg and/or manipulator leg can be sensed by a variety of sensors known in the machine tool industry and described in the prior art. For example, some ball screw actuators include a sensor, e.g. a resolver or encoder, that track the rotation and thereby the an indicates the position of the leg. Also, a sensing head and magnetic scale could be incorporated into each leg to indicate position by tracking its extension and retraction.

As shown in FIG. 1, machine 10 also includes a mounting structure 46 having a platform 47 connected to the three nodal structures 22 of first support structure 16 by brackets 48. A workpiece 50 can be attached to platform 47 via a fixture 52 to allow interaction between tool 40 and workpiece 50. It should be noted that, alternatively, tool 40 can be mounted to platform 47 while workpiece 50 is mounted to moveable component 38.

Figure 4:
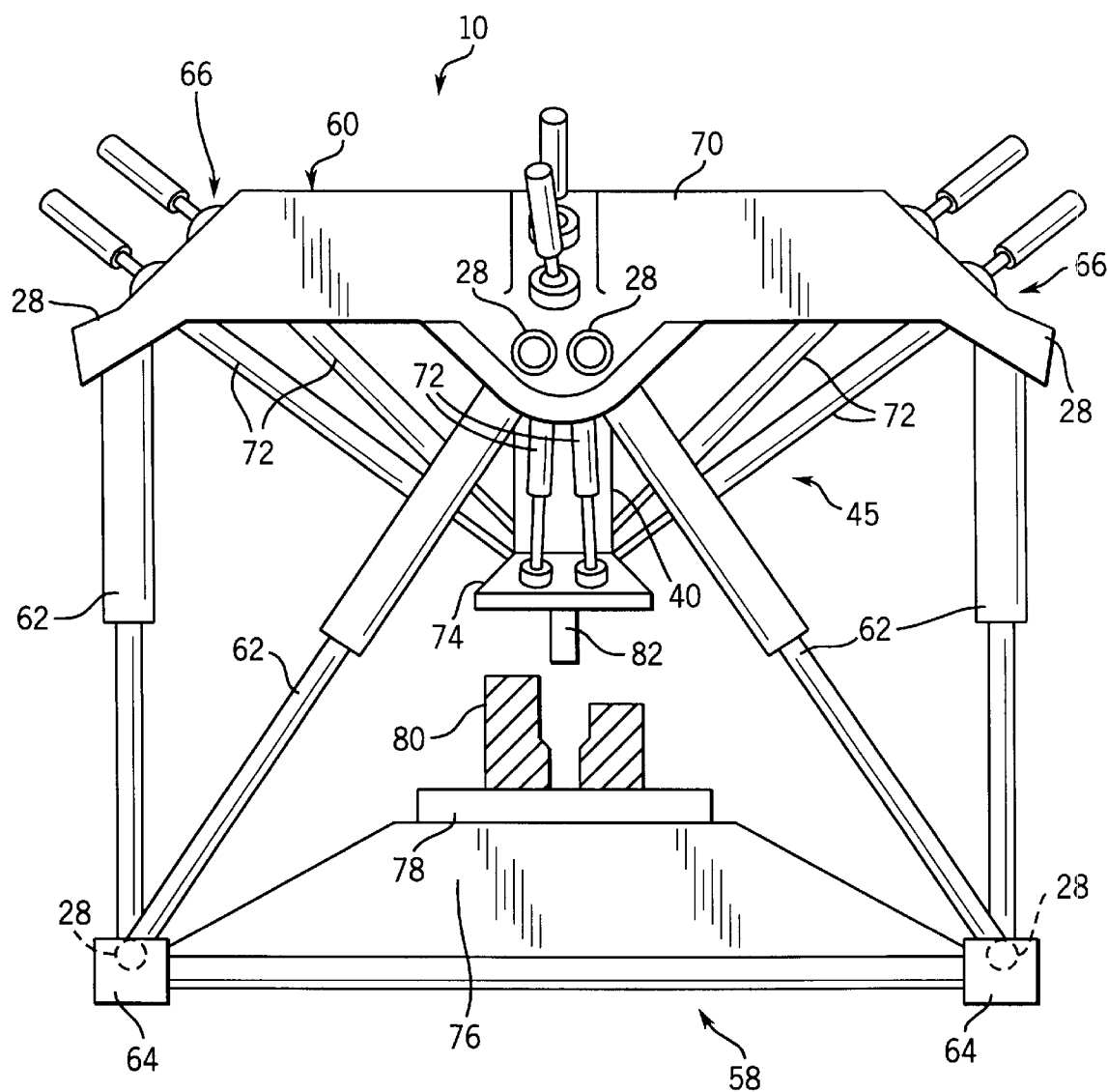
FIG. 4 is a front view of the machine illustrated in FIG. 3.

Referring generally to FIGS. 3 and 4, a slightly different embodiment of machine 10 is illustrated. However, to facilitate understanding, the same reference numerals used with FIGS. 1 and 2 are used to represent similar components in FIG. 3 and 4.

FIGS. 3 and 4 show a framework 56 having a generally octahedral shape, a base support structure 58 and an upper support structure 60. Base support structure 58 and upper support structure 60 are connected by a plurality, preferably six, extendible and retractable framework struts 62. Framework struts 62 are pivotably mounted to three nodes 64 of base support structure 58, as illustrated best in FIG. 3. Similarly, framework struts 62 are pivotably connected to three expanded node structures 66 of upper support structure 60. As described above, base support structure 58 preferably includes three support struts 68 arranged in a triangular pattern connected by nodes 64. Upper support structure 60 is similarly constructed with three upper support struts 70 connected by expanded node structures 66 to create the generally triangular form. However, upper support struts 70 and node structures 66 are enlarged, to facilitate the mounting of both hexapodal manipulator 45 and framework struts 62.

Hexapodal manipulator 45 includes six manipulator struts 72 that are preferably servostruts as described above. Two manipulator struts 72 are pivotably connected to each expanded node structure 66 at their base ends and to a moveable component 74 at their operator ends. Either tool 40 or a workpiece can be attached to movable component 74, depending on the specific application. A mounting structure 76 is connected to base support structure 58 at each node 64. As illustrated best in FIG. 4, a fixture 78 for holding a workpiece 80 can be attached to mounting structure 76, and tool 40, having a cutter 82, can be mounted on moveable component 74 for machining of workpiece 80.

The combination of a hexapodal manipulator with an adjustable framework permits great latitude in manipulating moveable component 74 with respect to mounting structure 76. Potentially, the framework struts 62 can move upper support structure 60 with respect to base support structure 58 along six different axes, i.e., with six degrees of freedom of motion. Simultaneously, manipulator struts 72 can provide moveable component 74 six-axis movement with respect to the mounting structure 76. By controlling the movement of framework struts 62 and manipulator struts 72, machine 10 is given broader versatility, particularly for awkward loading and unloading operations as well as complex manipulation of a tool with respect to a workpiece.

For simple procedures, on the other hand, framework struts 62 may only need to provide movement of upper support structure 60 along one axis with respect to base support structure 58. For example, framework struts 62 could be hydraulic actuators that simply spread apart upper support structure 60 and base support structure 58 to facilitate the loading and unloading of a workpiece onto mounting structure 76. In that case, the framework struts 62 are extended while the workpiece is attached to mounting structure 76. The framework struts 62 are then retracted and fixed in place, permitting tool 40 to perform desired operations on the workpiece.

It will be understood that the foregoing description is of preferred exemplary embodiments of this invention and that the invention is not limited to the specific forms shown. For example, various extensible and retractable struts can be used to construct both the frameworks and the manipulators. A wide variety of external framework configurations can be used including both self-contained type frameworks and those that require mounting to an additional support structure, such as a cement slab. A variety of control systems can be used to control the movement of both the framework and the manipulator, depending on the complexity of the controlled movements. Additionally, the support structures to which the framework struts are connected can either be solid platforms or interconnected nodes and struts. The tool can be any of a variety of tools, including a cutter or a sensor, such as a touch probe or a laser. Similarly, the workpiece includes materials to be cut, measured, tested, painted or subjected to any of a wide variety of procedures. These and other modifications may be made in the design and arrangement of the elements without departing from the scope of the invention as expressed in the appended claims.

What is claimed is:

1. A machine for manipulating one component with respect to another, comprising:
    a framework including a first support section and a second support section, the first support section and the second support section being connected by at least six framework struts, the framework struts being extensible and pivotably connected to the first support section and the second support section at predetermined locations to provide the framework with an octahedral shape;
    a manipulator connected to the first support section and including at least six manipulator struts, the manipulator struts being extensible and joined by a moveable component; and
    a mounting structure connected to the second support section, wherein the framework struts and the manipulator struts can be selectively extended and retracted to move the moveable component with respect to the mounting structure.

2. The machine as recited in claim 1, wherein the first support section includes three members connected in a triangular configuration.

3. The machine as recited in claim 2, wherein the second support section includes three members connected in a triangular configuration.

4. The machine as recited in claim 1, wherein each framework strut comprises a servostrut.

5. The machine as recited in claim 1, wherein each manipulator strut comprises a servostrut.

6. The machine as recited in claim 3, wherein the three members of the first support section are connected in the triangular configuration by nodal corner structures and the manipulator struts are pivotably mounted to the nodal corner structures with at least one manipulator strut being mounted to each nodal corner structure.

7. The machine recited in claim 1, further comprising a cutting tool mounted to the moveable component.

8. The machine recited in claim 1, further comprising a tool mounted to the movable component, wherein the second component comprises a workpiece.

9. A machine for manipulating one component with respect to another, comprising:
    an external framework including a pair of support structures connected by a plurality of framework struts, to form an interior region, wherein at least one of the framework struts is extensible and pivotably mounted to each support structure of the pair of support structures;
    a manipulator that can be attached to a movable component, the manipulator being able to move the movable component within the interior region along at least two axes; and
    a mounting structure connected to a second support structure of the pair of support structures; wherein the at least one framework strut can be selectively extended and retracted to move the moveable component through the interior region relative to the mounting structure.

10. The machine as recited in claim 9, wherein the manipulator includes at least three manipulator struts, each manipulator strut having a base end pivotably mounted to a first support structure of the pair of support structures and an operator end pivotably mounted to the movable component, the manipulator struts being selectively extendible and retractable.

11. The machine as recited in claim 9, wherein the framework includes a plurality of nodal structures and the framework struts are arranged and attached to the nodal structures to create adjacent triangular panels.

12. The machine as recited in claim 10, wherein the first support structure includes three support struts arranged in a triangular pattern.

13. The machine as recited in claim 9, wherein the mounting structure includes a fixture adapted to receive a workpiece and the movable component includes a tool.

14. The machine as recited in claim 9, wherein the manipulator includes six manipulator struts that provide the movable component six degrees of freedom of motion.

15. A method for moving one object along multiple axes with respect to another object, comprising the steps of:
    providing a framework having a first support structure and a second support structure connected by a plurality of extensible framework struts that permit the first support structure to be moved with respect to the second support structure;
    attaching a plurality of extensible manipulator struts to the first support structure; and
    pivotably connecting the plurality of extensible manipulator struts to a moveable component such that the movable component can be manipulated by the plurality of extensible manipulator struts along at least three axes with respect to the first support structure.

16. The method as recited in claim 15, wherein the step of providing a framework includes the step of arranging the extensible framework struts and the first and second support structures into a generally octahedral shape.

17. The method as recited in claim 16, wherein each support structure includes three support struts connected in a triangular pattern.

18. The method as recited in claim 17, further comprising the step of mounting a tool to the moveable component.

19. The method as recited in claim 18, further comprising the step of affixing a base to the second support structure, the base including a fixture for receiving a workpiece.

* * * * *